(12) United States Patent
Jacobson et al.

(10) Patent No.: US 9,517,669 B2
(45) Date of Patent: Dec. 13, 2016

(54) TOW HITCH WITH MOVABLE COUPLING

(71) Applicant: Premium Mining Services Pty Ltd, Teralba, NSW (AU)

(72) Inventors: Dale Peter Jacobson, The Branch (AU); Jamie Young, East Maitland (AU); Brett James Reddish, Wyee Point (AU)

(73) Assignee: PREMIUM MINING SERVICES PTY LTD, Teralba, NSW (AU)

( * ) Notice: Subject to any disclaimer, the term of this patent is extended or adjusted under 35 U.S.C. 154(b) by 135 days.

(21) Appl. No.: 14/384,539

(22) PCT Filed: Feb. 28, 2013

(86) PCT No.: PCT/AU2013/000184
§ 371 (c)(1),
(2) Date: Sep. 11, 2014

(87) PCT Pub. No.: WO2013/138842
PCT Pub. Date: Sep. 26, 2013

(65) Prior Publication Data
US 2015/0028564 A1    Jan. 29, 2015

(30) Foreign Application Priority Data

Mar. 19, 2012 (AU) ................................ 2012901098

(51) Int. Cl.
| | |
|---|---|
| *B60D 1/02* | (2006.01) |
| *B60D 1/36* | (2006.01) |
| *B60D 1/46* | (2006.01) |
| *B60D 1/40* | (2006.01) |
| *B60D 1/24* | (2006.01) |

(52) U.S. Cl.
CPC . *B60D 1/40* (2013.01); *B60D 1/02* (2013.01); *B60D 1/025* (2013.01); *B60D 1/246* (2013.01); *B60D 1/36* (2013.01); *B60D 1/465* (2013.01)

(58) Field of Classification Search
CPC ............. B60D 1/02; B60D 1/36; B60D 1/025; B60D 1/363; B60D 1/465; A01B 59/006
See application file for complete search history.

(56) References Cited

U.S. PATENT DOCUMENTS 3,313,558 A * 4/1967 Wolfgang ................ B60D 1/02
280/515
4,057,265 A * 11/1977 Grace .................... B60D 1/465
280/468

(Continued)

FOREIGN PATENT DOCUMENTS

GB           875270 A  *  8/1961 ............. B60D 1/465

OTHER PUBLICATIONS

International Search Report for PCT/AU2013/000184 dated May 20, 2013.

(Continued)

*Primary Examiner* — Paul N Dickson
*Assistant Examiner* — Daniel Yeagley
(74) *Attorney, Agent, or Firm* — Kilpatrick Townsend & Stockton

(57) ABSTRACT

A tow hitch with a main body which is adapted to be fixed relative to a towing vehicle, and a coupling movable relative to the body between a first position arranged to engage a tow bar, and a second position for towing.

9 Claims, 5 Drawing Sheets

(56) References Cited

U.S. PATENT DOCUMENTS

| | | | |
|---|---|---|---|
| 4,148,499 A * | 4/1979 | Johnson | B60D 1/465 |
| | | | 280/479.1 |
| 4,389,058 A | 6/1983 | Cadwell | |
| 4,431,207 A | 2/1984 | Langenfeld | |
| 4,482,166 A | 11/1984 | Van Antwerp | |
| 5,037,123 A * | 8/1991 | Smith | B60D 1/26 |
| | | | 280/477 |
| 5,193,838 A * | 3/1993 | Olson | B60D 1/26 |
| | | | 280/478.1 |
| 5,286,050 A | 2/1994 | Stallings, Jr. | |
| 5,427,399 A * | 6/1995 | Olson | A01B 59/042 |
| | | | 280/508 |
| 7,264,260 B2 * | 9/2007 | Overstreet | B60D 1/28 |
| | | | 280/461.1 |
| 2005/0184484 A1 * | 8/2005 | Johns | B60D 1/363 |
| | | | 280/515 |

OTHER PUBLICATIONS

Written Opinion of the International Preliminary Examining Authority for PCT/AU2013/000184 dated May 20, 2013.

\* cited by examiner

TOW HITCH WITH MOVABLE COUPLING

FIELD OF THE INVENTION

The present invention relates to a tow hitch particularly but not exclusively for heavy equipment such as used in the mining industry.

BACKGROUND OF THE INVENTION

A tow bar for a towed unit generally has a rest position near a ground surface and needs to be lifted to a tow hitch of a towing vehicle. In the mining industry, the towed unit and tow bar are extremely heavy. The weight of the tow bar may require it to be lifted by hydraulic jacks or the like. The vehicle and towed unit are rarely aligned as required so positioning the tow bar for pick by the tow hitch or maneuvering the towing vehicle to a suitable position for connection increases the difficulty of hitching the towed unit to the towing vehicle.

OBJECT OF THE INVENTION

The present invention seeks to provide an alternative form of tow hitch which by design decreases the risk of injury to operators seeking to attach towed implements and improves the efficiency of the process.

SUMMARY OF THE INVENTION

In accordance with the invention, there is provided a tow hitch with a main body which is adapted to be fixed relative to a towing vehicle, and a coupling movable relative to the body between a first position arranged to engage a tow bar, and a second position for towing.

Preferably, the coupling is connected to an actuator to lift and lower the coupling relative to the main body.

Preferably, the coupling is mounted on a slide and the actuator is in the form of a main cylinder mounted in the body of the tow hitch with a piston connected relative to the slide to drive the slide up and down in order to raise and lower the coupling.

Preferably, the tow hitch further includes a latching pin to mechanically lock the coupling in a raised position for towing.

Preferably, the latching pin is driven by a latching cylinder that is sequenced to automatically lock the piston when the coupling is lifted into the second position for towing.

Preferably, the tow hitch includes inlet and outlet plugs to couple to a hydraulic system of the vehicle in order to power the main cylinder and latching cylinder.

Preferably, the tow hitch includes a housing above the coupling, the housing supporting a linchpin, which passes through the coupling when the coupling is in the towing position, to thereby secure the tow bar to the hitch.

Preferably, the coupling includes an open mouth that tapers toward a back wall of the coupling, to direct the tow bar into position for receipt of the linchpin.

Preferably, the coupling includes an upper and lower plate with aligned through holes to receive the linchpin.

Preferably, the housing includes an aperture arranged above the through holes and the linchpin is seated in the aperture and depends from the aperture for movement in and out of the through holes as the coupling is raised and lowered relative to the housing.

Preferably, the tow hitch includes a tether coupled to the linchpin to allow the linchpin to be removed from the aperture, if needed, without being separated from the tow hitch.

Preferably, the tow hitch includes a lock device to releasably retain the linchpin in the aperture.

Preferably, the tow hitch further includes a latching pin to hold the coupling in the second position.

Preferably, the tow hitch further includes a latching cylinder to move the latching pin in and out engagement.

Preferably, the latching cylinder communicates with the actuator to allow the latching pin to engage and lock the cylinder in the raised, second position.

In another broad aspect, there is provided a hitch for interconnecting a towing vehicle with a towed apparatus including a main body, adapted to be fixed to one of the vehicle or apparatus, and a coupling movable between a first position, for engaging a tow bar of the other one of the vehicle or apparatus, and a second position for towing, wherein the hitch further includes a linchpin arranged to pass through the coupling as the coupling is lifted into the second position, to lock the tow bar into the hitch for towing.

Preferably, the hitch further includes an actuating cylinder for moving the coupling between the first and second positions.

Preferably, the hitch further includes a latching pin to mechanically lock the cylinder in the second position.

BRIEF DESCRIPTION OF THE DRAWINGS

The invention is described in more detail, by way of non-limiting example only, with reference to the accompanying drawings, in which.

DETAILED DESCRIPTION OF THE INVENTION

Figure 1:
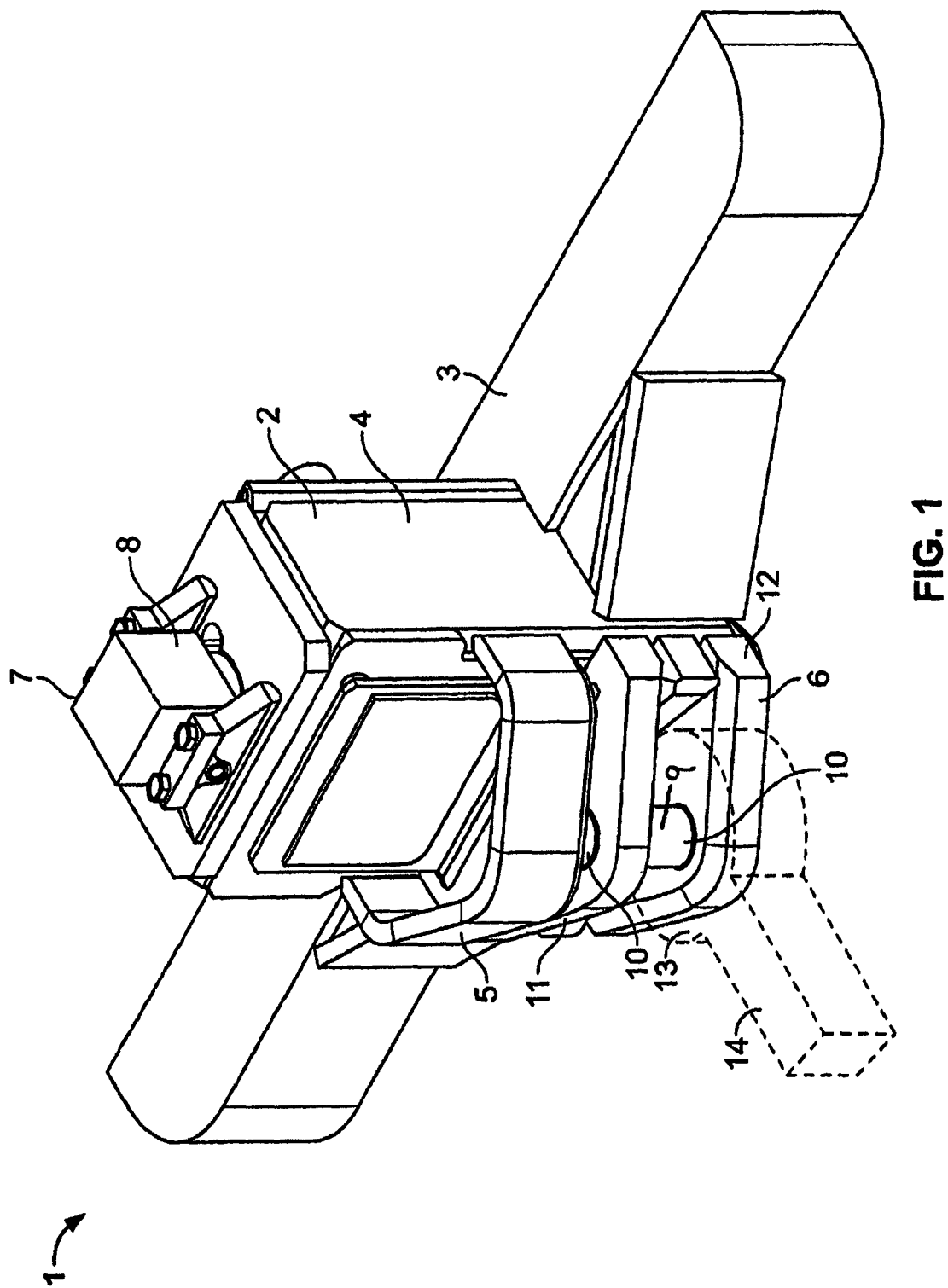
FIG. 1 is a perspective view of a tow hitch.

Referring firstly to FIG. 1, a tow hitch/tow clevis 1 is shown as including a main body 2 that has a mounting section 3, an actuator casing 4 and a housing 5. The tow hitch 1 also includes a coupling 6, which is shown in an elevated position for towing.

Figure 4:
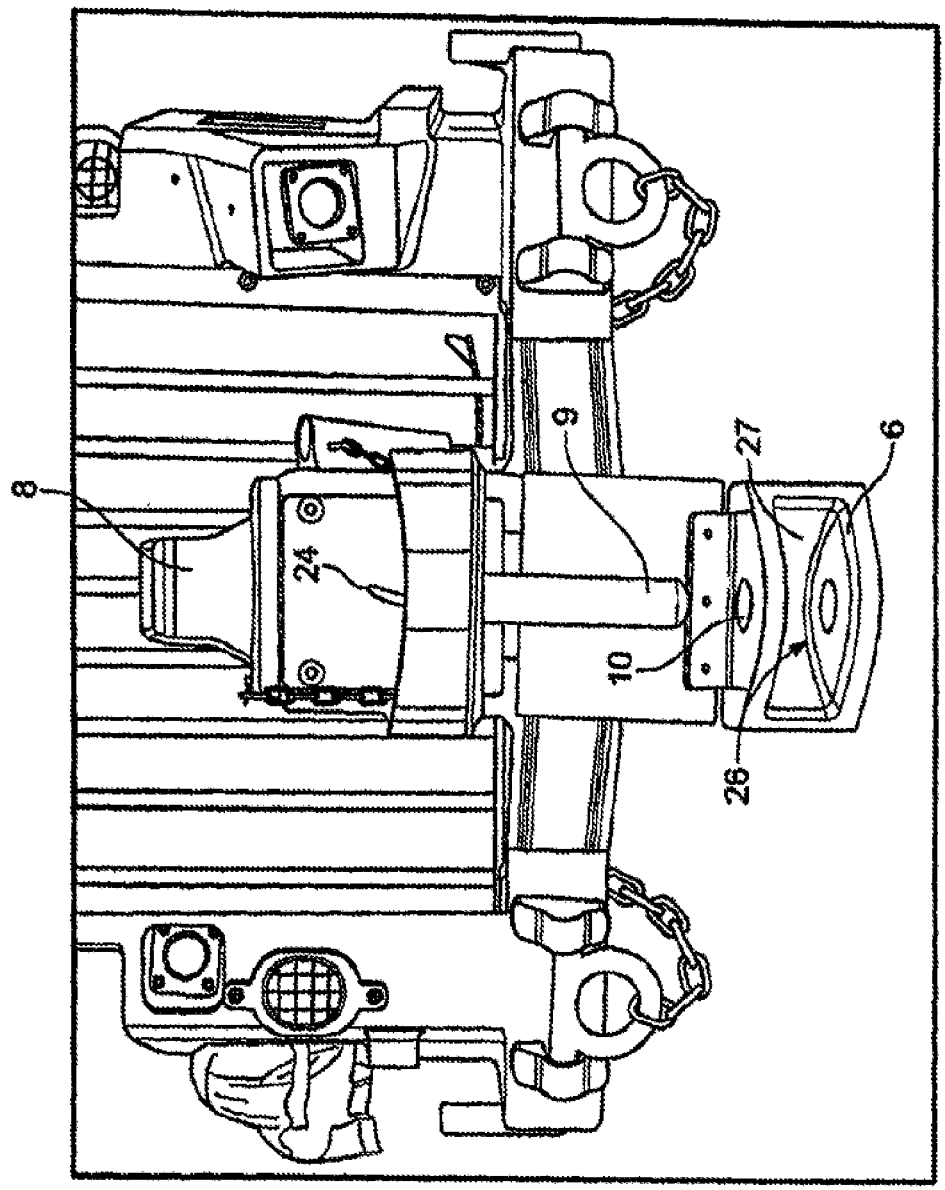
FIG. 4 is a front view of the tow hitch with a coupling in a lowered position.

The casing 4 holds an actuator 7 which is preferably in the form of a hydraulic main cylinder 8 arranged to move the coupling 6 between the elevated position and a lowered position (shown in FIG. 4).

The housing 5 supports a linchpin 9 that passes through aligned holes 10 in upper and lower plates 11, 12 of the coupling 6, to lock an eyelet 13 of a tow bar 14 in to the coupling 6.

Figure 2:
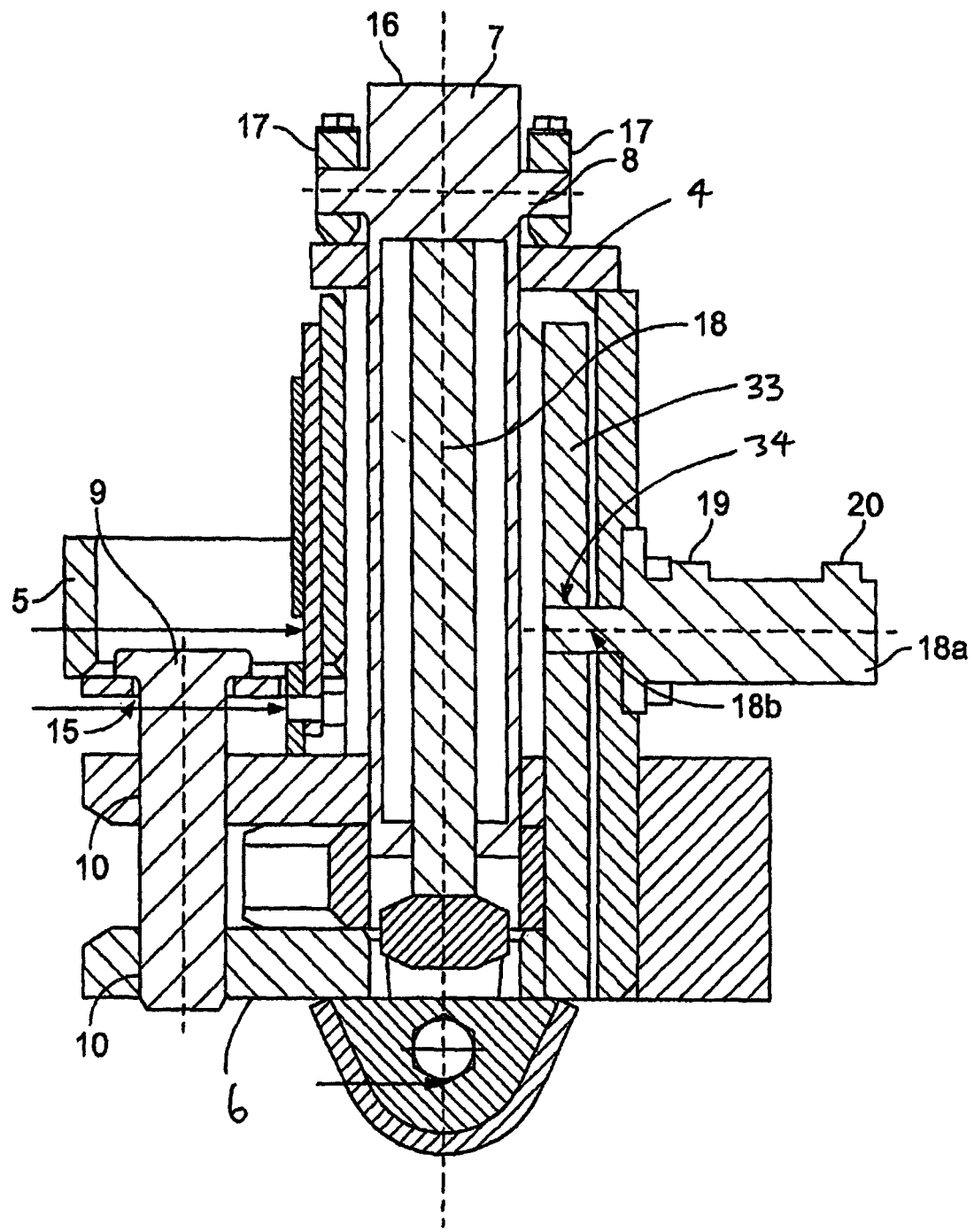
FIG. 2 is a cross-sectional view of the tow hitch.

Referring now to FIG. 2, the linchpin 9 is more clearly shown as being supported in an aperture 15 in the housing 5 to pass through the holes 10 in the coupling 6. FIG. 2 also shows the internal structure of the actuator 7.

The actuator 7 is, as mentioned, in the form of a hydraulic main cylinder 8 with a cylinder head 16 connected to the casing 4 by bolts 17. The cylinder 8 extends downwardly through the casing 4 and has a piston 18 that is connected to the coupling 6 so that up and down movement of the piston 18 results in corresponding movement of the coupling 6 between the first and second positions.

More particularly, the coupling 6 is mounted on a slide 33 that travels up and down inside the main body 2. The piston 18 is connected relative to the slide 33 to drive the slide 33, and thereby the coupling 6, between the first and second positions.

The tow hitch 1 also has a latching cylinder 18*a* with a latching pin 18*b* actuated by the latching cylinder 18*a* and piloted from inlet 19 and an outlet 20. The purpose of this latching arrangement is to mechanically lock the piston 18 and thereby the coupling 6 in the raised position during operation thus reducing load on the actuator 7 and associated coupling/clevises. The latching cylinder 18*a* is sequenced with the actuator 7 to automatically lock the piston 18 when the coupling 6 is lifted into the second piston. In the arrangement shown, this is achieved by way of the latching pin 18*b* engaging in a bore 34 formed in the slide 33. Since the slide 33 is fixed relative to the piston 18, the piston 18 will be locked in the raised position as a result.

Figure 3:
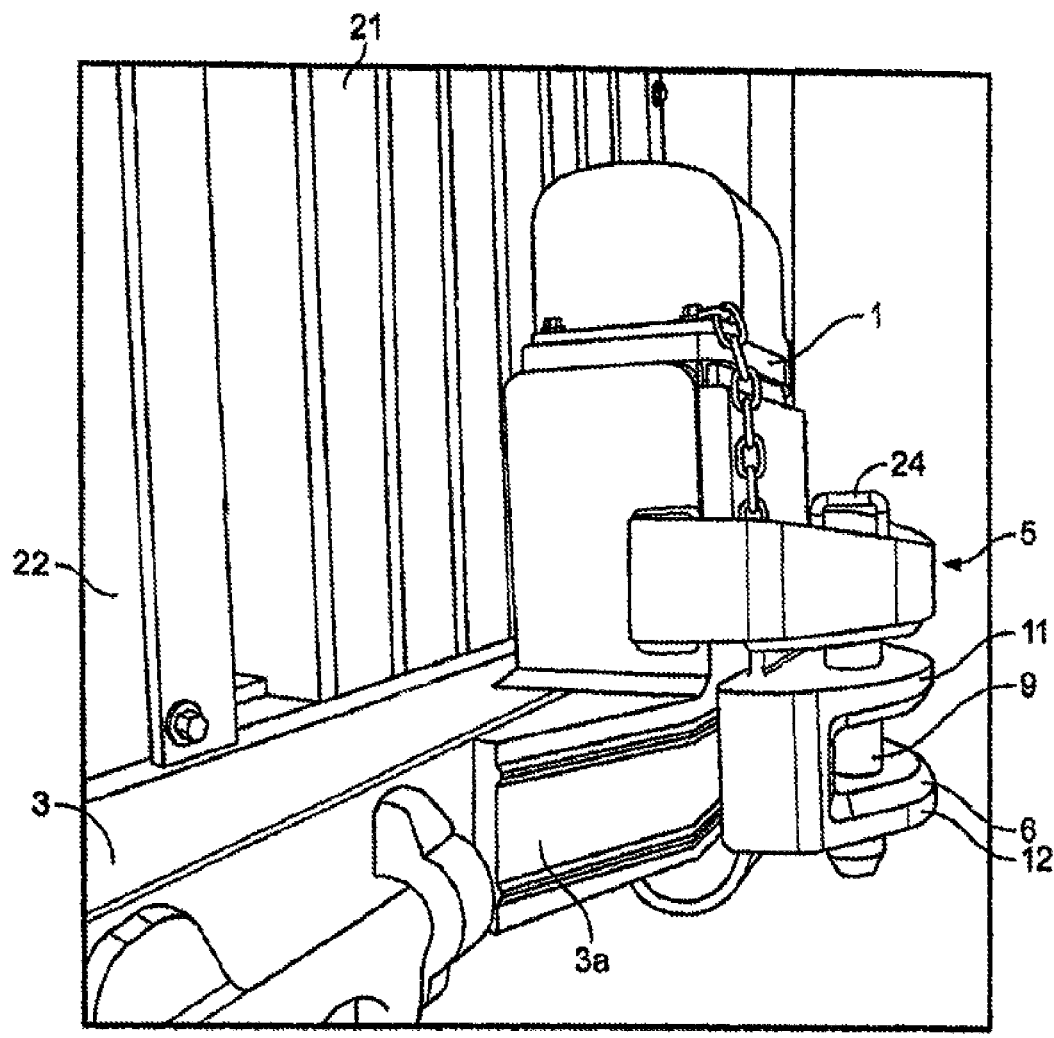
FIG. 3 is a perspective view of the tow hitch fitted to a vehicle.

Referring now to FIG. 3, the tow hitch 1 is shown attached to a front 22 of a vehicle 21. The body 2 of the tow clevis 1 is welded directly onto the existing structural member 3 of the vehicle. This attachment is then supported by gussets and bracing 3*a* to the required engineering specification. The hydraulic porting for the main cylinder 8 of the actuator 7 and the latching cylinder 18*a* are connected at the plugs 23 into a hydraulic circuit (not shown) of the vehicle 21, for operation of the actuator 7.

The linchpin 9 is shown extending from the housing 5 to pass though the upper and lower plates 11, 12 of the coupling 6. A handle 24 is provided so that the linchpin 9 can be manually removed from the housing 5.

Referring now to FIG. 4, the cylinder 8 has been activated to lower the coupling 6 to the lowered position. In that lowered or first position, the linchpin 9 is clear of the coupling 6, so that the coupling 6 can receive the tow bar 14 (shown in FIG. 1).

If the tow bar 14 is at a height where the coupling 6 needs to be lowered only a short distance, the linchpin 9 can be manually lifted out of the aperture 15 by the handle 24 to allow free access to the coupling 6.

The coupling 6 is formed with an open mouth 26 which tapers toward a back wall 27 of the coupling 6 so that the tow bar 14 can be guided into a central position where the eyelet 13 of the tow bar 14 is aligned with the through holes 10 and the aperture 15 of the housing.

When the tow bar 14 is positioned in that manner, the cylinder 8 is activated to lift the coupling 6 back to the elevated or second position, where the linchpin 9 passes through the housing 5, the eyelet 13 and the coupling 6 to lock all the components together for towing.

Figure 5:
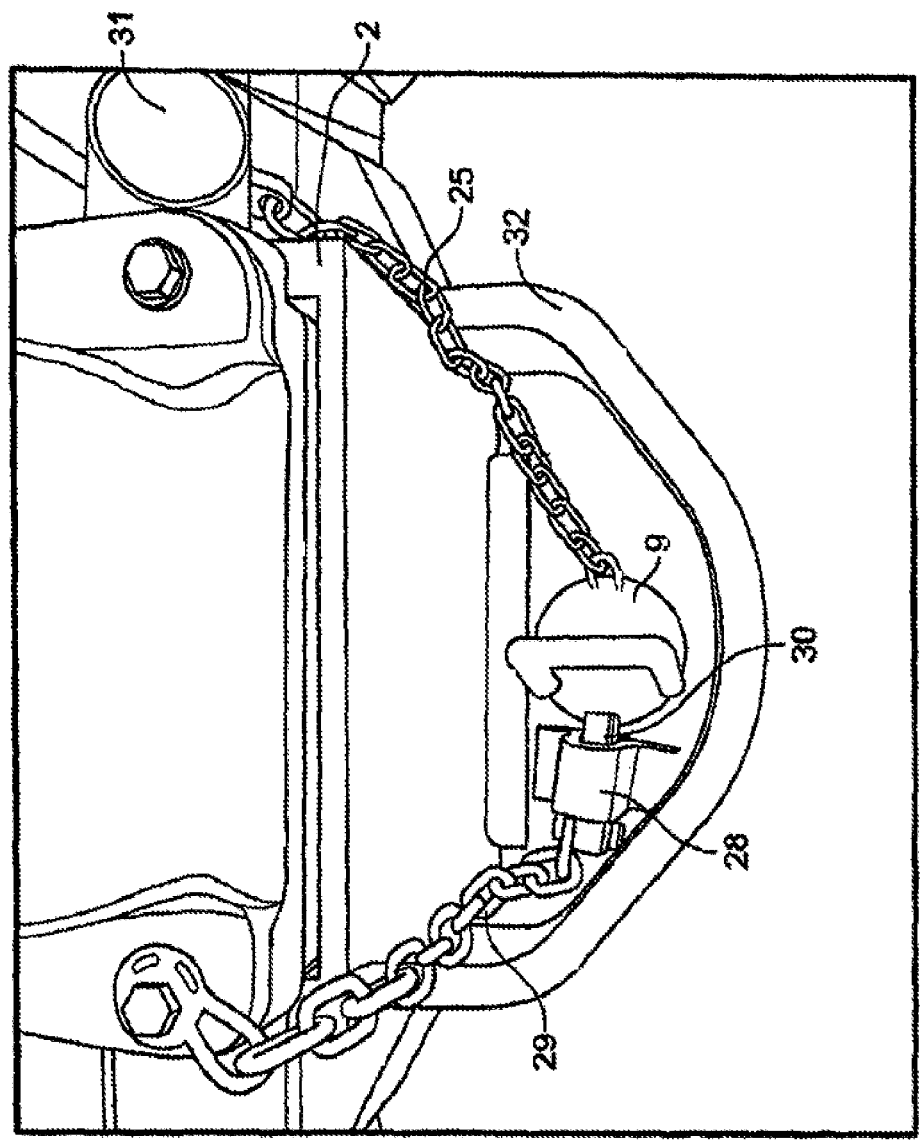
FIG. 5 is a top view of the tow hitch.

Referring now to FIG. 5, the linchpin 9 is shown attached to the body 2 by a tether chain 25 which is provided to prevent inadvertent separation of the linchpin 9 from the hitch 1. A locking device 28 secures the linchpin 9 in the aperture 15 during normal use. If the linchpin 9 needs to be removed, the locking device 28 is released by pulling chain 29, which causes locking pawl 30 to rotate free of the linchpin 9.

For convenience, the tow hitch 1 also includes a holder 31 for receiving the linchpin 9 when it is not in use. The housing 5 is formed with a protective wall 32 which provides protection for the locking device 28 and linchpin 9 against damage.

As may be appreciated, the tow hitch 1 provides a number of advantages.

The structure of the coupling 6 helps guide the tow bar 14 into an appropriate position for engagement with the linchpin 9. Most importantly, the ability of the coupling 6 to be moved by the actuator 7 for pick up of the tow bar 14 for return to a towing position means the tow bar 14 does not need to be separately (manually) lifted by the operator or assistant.

Obviously, various components of the tow hitch are subject to variation. For example, the specific form of the actuator and coupling may be varied as required and any other suitable mechanism for locking the various components for towing may be employed, in place of the linchpin 9.

Also, it should be appreciated, the hitch may be fitted to either one of the towing vehicle or the towed implement or unit, provided the coupling still serves to engage and lift the tow bar, connected to the other one of the towing vehicle or towed unit, into the towing position.

Indeed, the tow hitch 1 has been described by way of non-limiting example only and many modification and variations may be made thereto without departing from the spirit and scope of the invention described.

LIST OF PARTS

1. Two hitch
2. Main body
3. Member
3*a*. Gussets/bracing
4. Actuator casing
5. Housing
6. Coupling
7. Actuator
8. Main cylinder
9. Linchpin
10. Though holes
11. Upper plate
12. Lower plate
13. Eyelet
14. Tow bar
15. Aperture
16. Cylinder head
17. Bolts
18. Piston
18*a*. Latching cylinder
18*b*. Latching pin
19. Inlet
20. Outlet
21. Vehicle
22. Front
24. Handle
25. Tether
26. Open mouth
27. Back wall
28. Locking device
29. Chain
30. Pawl
31. Holder
32. Wall
33. Slide
34. Bore

The invention claimed is:

1. A tow hitch with a main body which is adapted to be fixed relative to a towing vehicle, and a coupling movable relative to the body between a first position arranged to engage a tow bar, and a second position for towing;

wherein the coupling is connected to an actuator to lift and lower the coupling relative to the main body;

wherein the coupling is mounted on a slide and the actuator includes a main cylinder mounted in the body of the tow hitch with a piston connected relative to the slide to drive the slide up and down in order to raise and lower the coupling; and a latching pin to mechanically lock the coupling in the second position for towing;

wherein the latching pin is driven by a latching cylinder that is sequenced to automatically lock the piston when the coupling is lifted into the second position for towing.

2. The tow hitch of claim 1, wherein the tow hitch includes inlet and outlet plugs to couple to a hydraulic system of the towing vehicle in order to power the main cylinder and latching cylinder.

3. The tow hitch of claim 1, wherein the tow hitch includes a housing above the coupling, the housing supporting a linchpin, which passes through the coupling when the coupling is in second position, to thereby secure the tow bar to the hitch.

4. The tow hitch of claim 3, wherein the coupling includes an open mouth that tapers toward the back wall to direct the tow bar into position for receipt of the linchpin.

5. The tow hitch of claim 3, wherein the coupling includes an upper and lower plate with aligned through holes to receive the linchpin.

6. The tow hitch of claim 5, wherein the housing includes an aperture arranged above the through holes and the linchpin is seated in the aperture and extends from the aperture for movement in and out of the through holes as the coupling is raised and lowered relative to the housing.

7. The tow hitch of claim 6, wherein the tow hitch includes a tether coupled to the linchpin to allow the linchpin to be removed from the aperture, if needed, without being separated from the tow hitch.

8. The tow hitch of claim 7, further including a lock device to releasably retain the linchpin in the aperture.

9. A hitch for interconnecting a towing vehicle with a towed apparatus including a main body, adapted to be fixed to one of the vehicle or apparatus, and a coupling movable between a first position, for engaging a tow bar of the other one of the vehicle or apparatus, and a second position for towing, wherein the hitch further includes a linchpin arranged to pass through the coupling as the coupling is lifted into the second position, to lock the tow bar into the hitch for towing;

an actuating cylinder for moving the coupling between the first and second positions;

a latching pin to mechanically lock the cylinder in the second position; and wherein the latching pin is driven by a latching cylinder that is sequenced to automatically lock a piston of the actuating cylinder when the coupling is lifted into the second position for towing.

* * * * *